United States Patent
Watson et al.

(10) Patent No.: US 6,536,700 B2
(45) Date of Patent: Mar. 25, 2003

(54) VARIABLE TENSION FIBER WINDING

(75) Inventors: Johnnie E Watson, Hampstead, NC (US); Manivannan Ravichandran, Wilmington, NC (US); Chester H. Chang, Wilmington, NC (US); Lindwood A. Bird, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/903,256

(22) Filed: Jul. 12, 2001

(65) Prior Publication Data

US 2002/0060265 A1 May 23, 2002

Related U.S. Application Data

(60) Provisional application No. 60/217,492, filed on Jul. 11, 2000.

(51) Int. Cl.[7] .......................... B65H 77/00; B65H 59/12
(52) U.S. Cl. .................. 242/419.7; 226/44; 242/154
(58) Field of Search .................. 242/419.7, 154, 242/155 M, 920; 226/44

(56) References Cited

U.S. PATENT DOCUMENTS

| 3,331,568 A | * | 7/1967 | Okamura | 242/154 |
| 3,677,483 A | | 7/1972 | Henrich | 242/25 |

(List continued on next page.)

FOREIGN PATENT DOCUMENTS

| DE | 3343286 A1 | 6/1985 | .......... G65H/59/26 |
| DE | 41 04 087 A1 | * 8/1991 | .......... 242/419.7 X |
| EP | 0 261 772 A | 3/1988 | .......... C03C/25/02 |
| EP | 0650914 | 12/1998 | .................... 54/34 |
| EP | 0881185 | 12/1998 | |
| EP | 0 976 693 A | 2/2000 | .......... C03C/25/10 |
| GB | 1 477 171 | 6/1977 | ............ G02B/5/14 |
| JP | 5957862 | 4/1984 | ........................ 37/7 |
| JP | 63170238 A | 7/1988 | ........................ 37/7 |
| JP | 0132159 | 12/1989 | .......... B65H/54/02 |
| JP | 05273416 | 10/1993 | ............ G02B/6/00 |
| JP | 08324885 | 12/1996 | .......... B65H/59/38 |
| WO | WO 95/20538 | 8/1995 | .................... 59/38 |

OTHER PUBLICATIONS

Database WPI, Section Ch, Week 199013, Derwent Publications Ltd., London, GB; Class A89, AN 1990–095940, XP002183929 & JP 02 048434 A (Sumitomo Electric IND Co), Feb. 19, 1990, abstract.
Database WPI, Section Ch, Week 199832, Derwent Publications Ltd., London, GB; Class A85, AN 1998–373231, XP002183930 & JP 10 15003 A (Matsushita Denki Sangyo KK), Jun. 2, 1998, abstract.
Japanese Abstract 01321259.
Japanese Abstract 05273416.
Japanese Abstract 08324885.

*Primary Examiner*—Kathy Matecki
*Assistant Examiner*—Minh-Chau Pham
(74) *Attorney, Agent, or Firm*—Timothy R. Krogh

(57) ABSTRACT

The invention relates to a method of winding optical fiber onto a spool. The method includes varying a target, tension applied to a fiber as the fiber accumulates onto the spool such that the percentage change in lateral load is greater than about −3.4% for each change of about 0.25" in pack radius. The method also includes varying the target tension such that the change in lateral load per change in pack radius includes an amount greater than about −18.0 N/m². Additionally the invention includes varying the target tension applied to the optical fiber as the fiber accumulates onto the spool, such that the target tension applied to the fiber at the end of winding fiber onto the spool is at least about 0.1% or greater than the target tension at the start of winding fiber onto the spool.

24 Claims, 5 Drawing Sheets

U.S. PATENT DOCUMENTS

| | | | |
|---|---|---|---|
| 3,966,133 A | 6/1976 | Gelin | 242/42 |
| 4,083,506 A | 4/1978 | Mander et al. | 242/25 |
| 4,232,838 A * | 11/1980 | Bravin | 242/154 X |
| 4,383,653 A | 5/1983 | Nakazawa et al. | 242/43 |
| 4,519,198 A | 5/1985 | Kissel | 57/71 |
| 4,685,190 A * | 8/1987 | Specht et al. | 242/154 X |
| 4,752,043 A | 6/1988 | Heinzer | 242/18 G |
| 4,969,711 A | 11/1990 | Rogler et al. | 350/96.34 |
| 5,046,673 A | 9/1991 | Moussalli | 242/18 R |
| 5,277,373 A | 1/1994 | Morton | 242/45 |
| 5,475,887 A * | 12/1995 | Moussalli | 8/155.1 |
| 6,027,062 A * | 2/2000 | Bacon et al. | 242/419.7 X |

\* cited by examiner

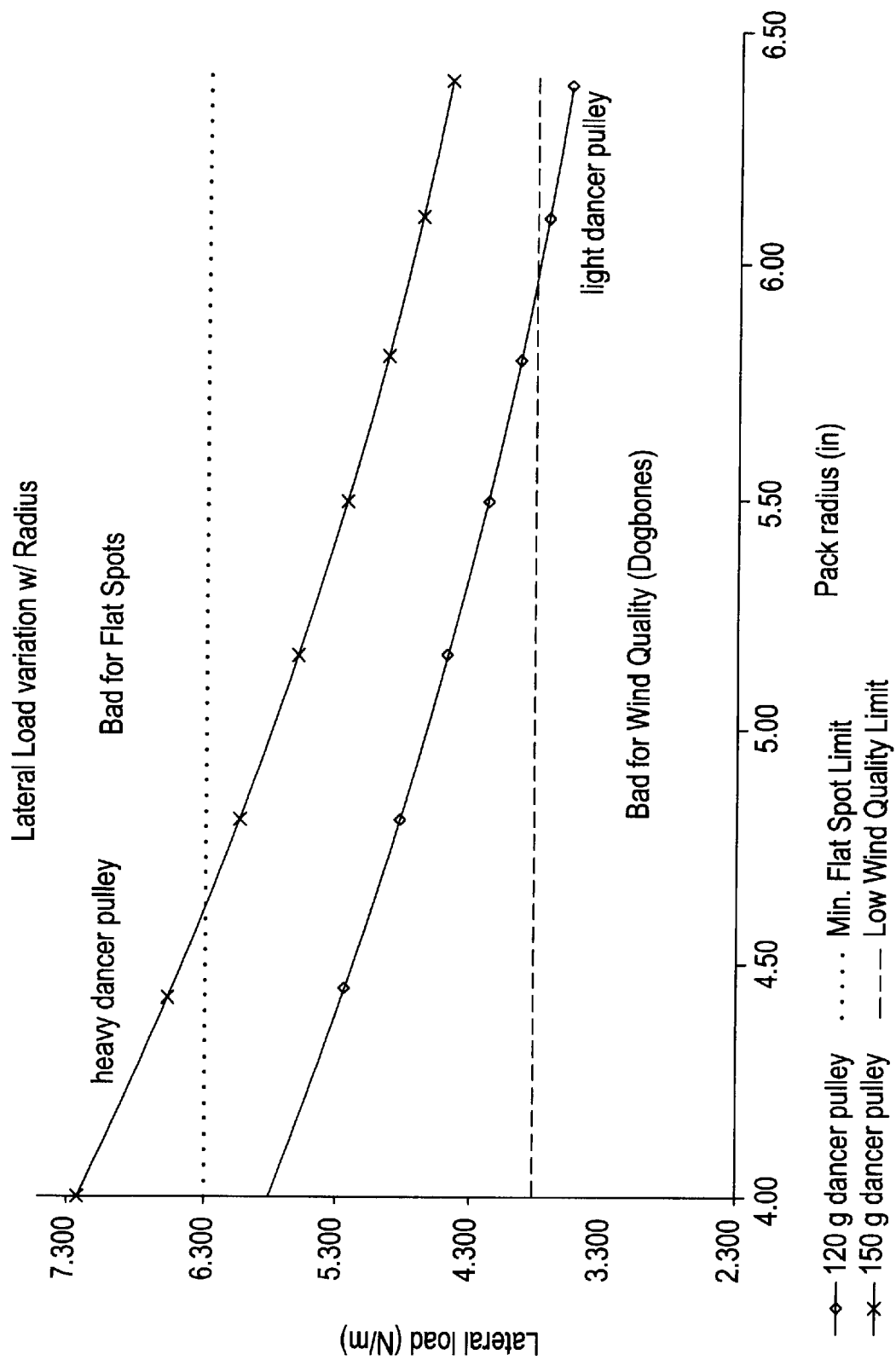

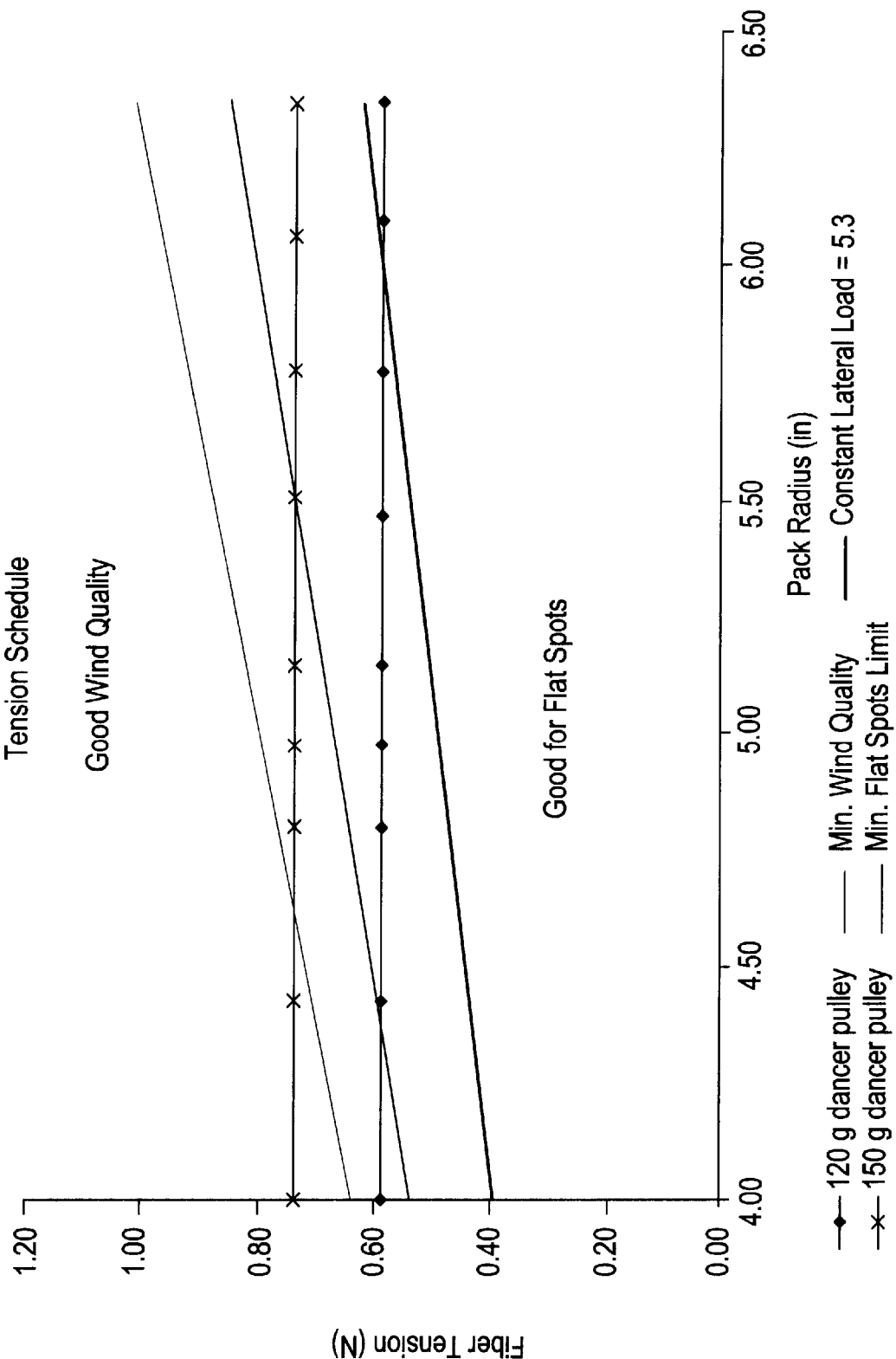

VARIABLE TENSION FIBER WINDING

CROSS-REFERENCE TO RELATED APPLICATIONS

This application is based upon U.S. Provisional Application Ser. No. 60/217,492 filed on Jul. 11, 2000, from which the benefit of priority pursuant to 35 USC § 120 is hereby claimed, and the full content which is incorporated herein by references as though fully set forth.

BACKGROUND OF THE INVENTION

1. Field of the Invention

The present invention relates generally to optical fibers, and particularly to methods of winding optical fiber onto a spool.

2. Technical Background

Optical fiber (hereinafter "fiber") produced by a drawing process must be packaged into easily transportable units. Typically this is done by winding the fiber onto a spool. The fiber may be stored on the spool as it travels between intermediate process steps of the fiber making and/or testing process or the fiber may be shipped to customers on the spool. In the fiber manufacturing facility, the fiber is unwound from the spool for testing. The fiber is also unwound by customers in the process of manufacturing optical fiber cables. Therefore, the wind quality of the fiber wound onto the spool is important and must be such that the fiber can be removed (a.k.a. paid off) from the spool without breakage or sustaining damage of any sort to the fiber.

Typically fiber is wound onto spools under constant winding tension. Winding tension refers to the tensile load in the fiber when it is wound onto a spool. This may be accomplished by moving a dancer pulley, in the fiber wind path, which maintains a constant tension upon the fiber, despite any increases or decreases in fiber length through the wind path. The pulley applies a directional force which generates tension in the fiber.

If the wind tension is low, the wind quality can be poor. Winding defects include loose wrap and dogbone. In the case of loose wrap, the fiber is not wound securely around the spool and may easily unravel from the spool and/or shift on the spool which hinders the process of paying off the fiber.

The other fiber winding defect that can occur during winding is "dogbone". Dogbone occurs when the fiber starts to accumulate in excess at one or both of the flanges of the spool in comparison to the fiber wound across the face of the spool. Often this will simultaneously occur at both flanges of the spool.

On the other hand, too high a tension can cause excessive deformation of the coating layers applied to the fiber. Irreversible deformation of the fiber coating is commonly referred to as "flat spots." This typically occurs when the fiber is wound under too high a tension during the fiber draw process. During winding at the fiber draw, the fiber coating may still be pliable. Pressure between layers of fiber on the spool, resulting from winding the fiber under tension can cause deformation of the coating at the point of contact between two or more fibers. If the pressure is sufficiently high, the limits of the elastic deformation of the coating are exceeded and an irreversible flat spot is formed. Winding the fiber under extremely high tension may also cause the fiber to break.

SUMMARY OF THE INVENTION

One aspect of the present invention is a method of winding fiber onto a spool. The method includes varying a target tension applied to a fiber as the fiber accumulates onto the spool such that the percent change in lateral load is greater than about −3.4% for each change of about 0.25" in pack radius. Aspects of the invention also include varying the target tension such that the change in lateral load per change in pack radius comprises an amount greater than about −18.0 N/m$^2$.

An additional aspect of the invention is a method of winding optical fiber onto a spool. The method includes varying the target tension applied to the optical fiber as the fiber accumulates onto the spool, such that the target tension applied to the fiber at the end of winding fiber onto the spool is at least about 0.1% or greater than the target tension at the start of winding fiber onto the spool.

Another aspect of the invention is a method of winding optical fiber onto a spool, which includes increasing the target tension applied to the fiber as the fiber accumulates onto the spool such that the lateral load applied to the fiber is substantially constant throughout the wound fiber.

The invention results in a number of advantages. For example, by practicing the invention, the wind quality of fiber wound onto a spool is improved. Practicing the invention will also result in the prevention of permanent deformation of a coating or coatings applied to the fiber without jeopardizing wind quality. Practicing the invention further results in the advantage of increasing the useable size of the spool. An increase in useable spool size can increase yields and increase utilization. Also, the invention may be adapted to existing manufacturing equipment and be practiced as the fiber is being continually drawn and wound onto the spool.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

BRIEF DESCRIPTION OF THE DRAWINGS

FIG. 6 is a graph of lateral load as a function of pack radius.

FIG. 7 is a graph of increasing tension as a function of pack radius.

DETAILED DESCRIPTION OF THE INVENTION

Figure 1:
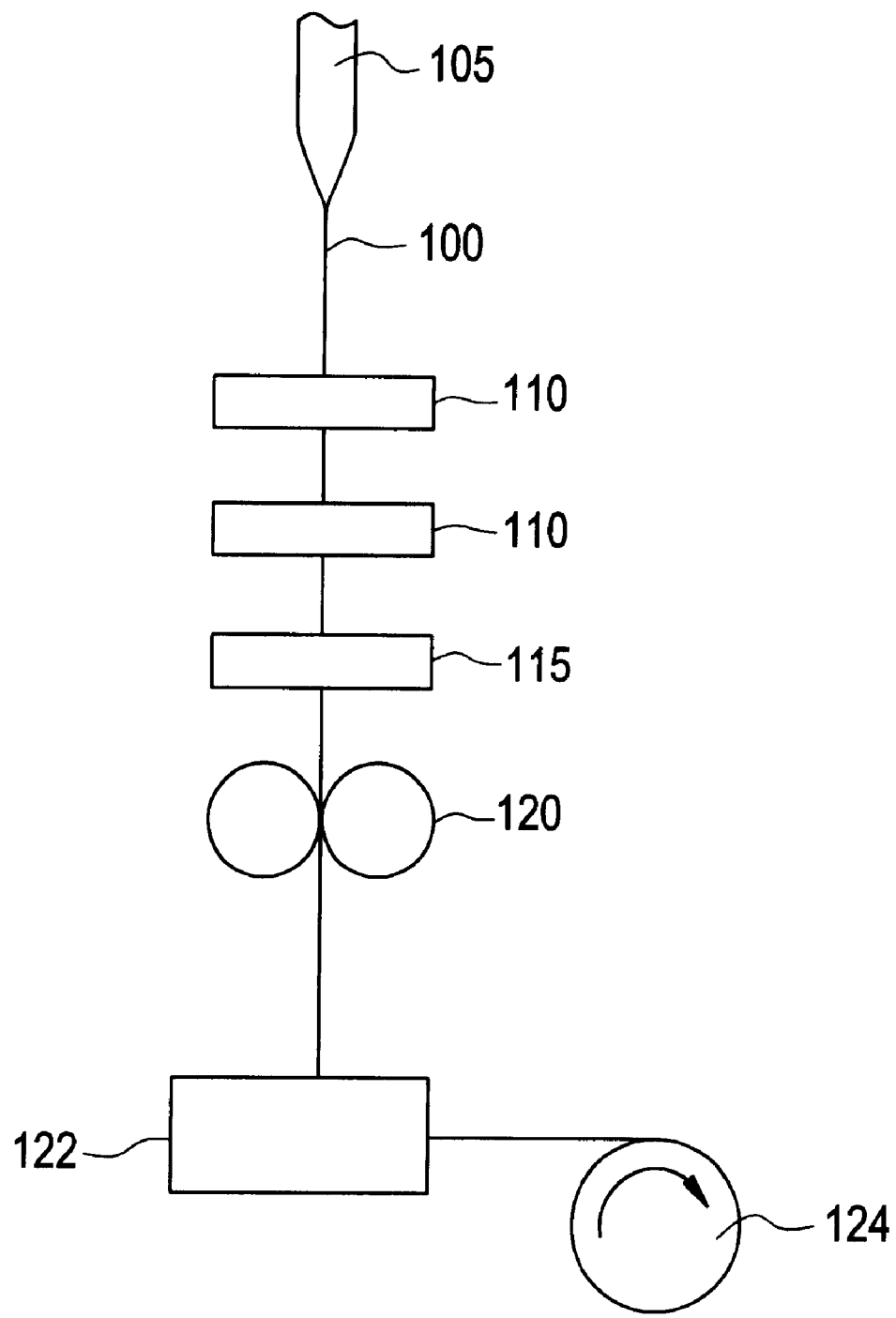
FIG. 1 is a schematic view of the fiber drawing and winding process.

Reference will now be made in detail to the present preferred embodiments of the invention, examples of which are illustrated in the accompanying drawings. Wherever possible, the same reference numbers will be used throughout the drawings to refer to the same or like parts.

It has been discovered that winding fiber under constant tension is not the best practice for optimal wind quality and/or minimizing flat spots. The curvature of the spool produces a lateral load force component from the fiber tension. The lateral load applies a force normal to the surface of the fiber wound on a spool. Lateral load is defined as fiber winding tension divided by radius of curvature of the fiber wound on the spool. In the case of a constant fiber tension, as more fiber accumulates on the spool during winding, the lateral load force applied to the wound fiber diminishes.

Wind pressure is the lateral load distributed over the contact area between two fibers (wind pressure=lateral load/contact area). Therefore, for constant tension winding, the wind pressure decreases as the radius of the fiber wound onto the spool increases. Too high a wind pressure can cause deformation of the protective fiber coating. Examining a spool during winding, for constant winding tension, the wind pressure at the barrel of the spool is relatively high. A high wind pressure is a good condition to avoid loose wrap, however, high wind pressure has exhibited a propensity to form flat spots on the wound fiber.

Compared to high wind pressure, low wind pressure may lead to a loose wrap without the formation of flat spots. The problems associated with low wind pressure, such as loose wrap, are especially noticeable if the change in the pack radius is large. Pack radius is the radius of the outside layer of fiber accumulated on a spool.

The invention utilizes variable winding tension to optimize wind quality and minimize the propensity for the formation of flat spots. The wind quality improves directly as wind pressure increases. However, increasing wind pressure can also cause the formation of flat spots. Blindly increasing the wind pressure will cause flat spots and decrease fiber circularity. In contrast, decreasing the winding pressure will cause the wind quality to lessen to unsatisfactory levels. Therefore, in the present invention, it is preferred that winding tension is changed as the radius of the spooled fiber changes to maintain constant winding pressure. It is preferred that the winding tension is increased as the pack radius increases. It is more preferred that the amount of increase in the tension applied to the fiber is proportional to an increase in the pack radius. It is also preferred that the tension is increased in a manner to maintain a substantially constant lateral load. In this way, when the lateral load appropriate for the winding conditions (coating properties, crossover angle, etc.) is applied, wind quality will improve and flat spots will not be formed.

The wind quality of a spool wrapped in accordance with the invention will be superior to that of one wrapped under the condition of constant wind tension. For fiber wrapped under the condition of a substantially constant lateral load, the wind quality and reversible coating deformation will be constant throughout the fiber wound on the spool. Flat spots will not form on fiber wrapped in accordance with the invention. The invention includes a method of winding fiber onto a spool. The method includes varying a tension applied to the fiber as fiber accumulates onto the spool. Preferably, the tension is increased as fiber accumulates on the spool. Preferably, a substantially constant lateral load is maintained on the fiber accumulated on the spool.

One way that the substantially constant lateral load can be defined in the invention is that the variation in lateral load at the end of winding fiber onto the spool is less than about 25% of the lateral load at the beginning of winding fiber onto the spool. It is more preferred that the ending lateral load is within a range of about 15% or less of the beginning lateral load. It is most preferred that the ending lateral load is within a range of about 5% or less of the beginning lateral load. It is also preferred that the lateral load during winding does not exceed the above preferred values for percent change in lateral load and then drop down to the preferred value at the end of winding fiber onto the spool. In the above description, the end of winding fiber on the spool is described as when the spool is full of fiber. The percent difference in lateral load was determined in accordance with the following formula:

% change in lateral load ($\Delta LL\%$)=absolute value ($100*[(LL(re)-LL(rb))/LL(rb)]$).

In the above formula LL(rb) is the lateral load at the beginning of winding the fiber and LL(re) is the lateral load at the end of winding the fiber.

A substantially constant lateral load may also be defined in terms of about a 0.25" change in pack radius. The lateral load may be deemed substantially constant if the percent change in lateral load per at least a 0.25" increase in pack radius is greater than about −3.4%. It is more preferred that the change in lateral load is greater than −1.0%. It is also preferred that the percent change in lateral load is not more than 5%, more preferably that the percent change in lateral load is not more than 1%. The percent change in lateral load was calculated in accordance with the following formula:

$\Delta LL\%=100*[(LL(r2)-LL(r1))/LL(r1)]$.

In the above formula LL(r1) is the lateral load at first pack radius and LL(r2) is the lateral load at a second pack radius. Pack radius r2 is at least 0.25" greater than pack radius r1.

A substantially constant lateral load may also be defined in terms of a change in lateral load per change in pack radius. The lateral load may be deemed substantially constant if the change in lateral load per change in pack radius is greater than about $-18.0$ N/m$^2$. It is more preferred that the change in lateral load per change in radius is greater than about $-9.0$ N/m$^2$ and most preferred that the change in lateral load per change in pack radius is greater than about $-1.0$ N/M$^2$. It is also preferred that the change in lateral load per change in pack radius is not more than 10.0 N/M$^2$, more preferably not more than 5.0 N/m$^2$, and most preferably not more than 1.0 N/m$^2$. The change in lateral load per change in pack radius was calculated in accordance with the following formula:

$\Delta LL/\Delta r=[(LL(r2)-LL(r1))/LL(r1)]/[r2-r1]$.

In the above formula LL(r1) is the lateral load at a first pack radius (r1) and LL(r2) is the lateral load at a second pack radius (r2). Pack radius r2 is greater than pack radius r1. With respect to the above formulas, the increased tension to maintain the lateral load substantially constant may also be known as the target tension.

The invention will further be described in terms of the accompanying drawings. A typical fiber draw operation can be represented by the schematic in FIG. 1. It comprises four major steps: (1) drawing fiber 100 from a preform 105 disposed in a draw furnace; (2) passing fiber 100 through at least one coater 110 for coating fiber 100 with at least one UV curable acrylate coating; (3) curing the coating by passing the coated fiber through at least one curing element 115; and (4) winding the coated fiber onto a spool for storage and transport. The winding portion starts at the tractor 120 where the fiber is pinched between a belt and a capstan. The fiber then moves to the dancer assembly 122 and continues on to the take-up spool 124. Because the fiber is effectively attached to a surface of the take-up spool and pinched at the tractor, any speed mismatch between the tractor and the take-up spool will result in a change of length in the fiber between the tractor and the take-up spool.

Figure 2:
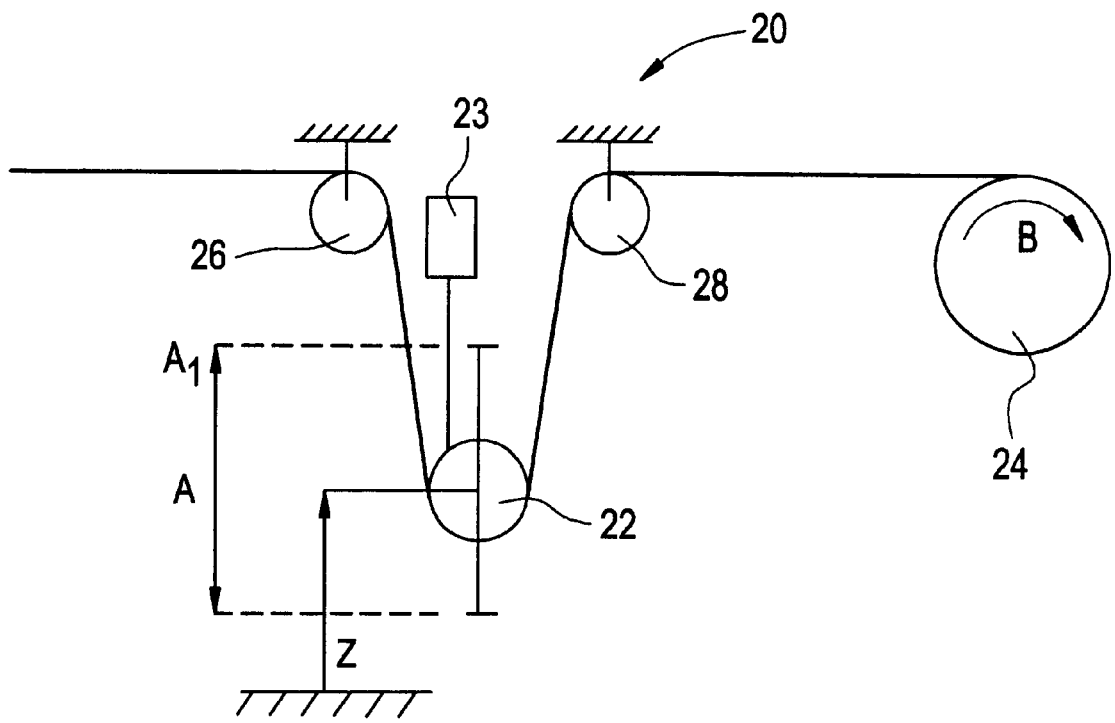
FIG. 2 is a schematic view of an embodiment of the invention.

The dancer assembly illustrated in FIG. 1 is further illustrated in FIG. 2 along with a take-up spool. The dancer assembly is designated as 20 in FIG. 2. Dancer assembly 20 includes a dancer pulley 22. A dancer pulley is a pulley in the wind path that is free to move. Pulley 22, shown, is a linear dancer pulley that moves in the path represented by line A. Take-up spool 24 rotates in the direction of arrow B. The invention is not limited to moving the pulley 22 in a vertical direction. One way the invention may be practiced is by moving pulley 22 in a horizontal direction or any combination of vertical and horizontal directions that will increase the optical fiber pathway between tractor 120 and take-up spool 124, as shown in FIG. 1.

Pulley 22 may serve several functions. Because pulley 22 is free to move, it can accommodate the aforementioned change in fiber length by moving up or down. This change in position may also be used as an input to control the take-up spool speed. If the position of pulley 22 deviates upwards from the run location setpoint, the take-up spool may be commanded to slow down accordingly to lengthen the fiber between the tractor and take-up spool thus lowering the dancer pulley.

Figure 3:
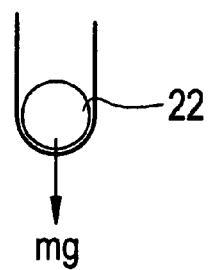
FIG. 3 is a side view of a deadweight dancer pulley in accordance with the invention.

Another function of dancer pulley 22 is to create tension in the fiber. It is preferred that the direction of gravity acts nearly parallel to the axis of the dancer motion, represented by arrow mg shown in FIG. 3. In this respect pulley 22 may also be known as a deadweight dancer pulley. The free body diagram shown in FIG. 3 describes to those skilled in the art the relationship between fiber tension and deadweight dancer mass. For example, if dancer pulley 22 has a mass of 120 g, the resulting tension in the fiber is 0.59N. That is, the fiber tension equals ½*pulley mass*acceleration of gravity. If the barrel of take-up spool 24 is about 4 inches (0.1 m), the corresponding lateral load for a 4 inch radius is about 5.8 N/m. The lateral load was calculated in accordance with the following formula: ½ mass of pulley 22* acceleration of gravity/radius of spool 24. Therefore, a dancer pulley of 120 g and a take-up spool with a 4 inch radius, produces a lateral load of about 5.8 N/m. As fiber builds up on the take-up spool, the pack radius increases. On large spools, this results in a large change in lateral load. Continuing with this example, as the pack reaches a radius of 6 inches, the lateral load reduces to about 3.8 N/m. This is a significant change in lateral load which has implications regarding wind quality as well as formation of flat spots.

As illustrated in FIG. 2, the target tension necessary to maintain the lateral load substantially constant as fiber accumulates on take-up spool 24 may be applied through pulley 22 in various manners. In one embodiment illustrated in FIG. 2, an air cylinder 23 is connected to pulley 22 to increase the effective weight of pulley 22. The effective weight of pulley 22 may be increased by the air cylinder exerting a force on pulley 22 in a downward direction. Preferably, the force exerted on pulley 22 is sufficient to inhibit pulley 22 from moving in a direction to reduce the fiber pathway, as discussed above. Furthermore, as fiber continues to accumulate on take-up spool 24, air cylinder 23 must exert a greater force to maintain a substantially constant lateral load.

Also shown in FIG. 2 are two support pulleys 26, 28. Pulley 26 is an upstream support pulley and pulley 28 is a downstream support pulley. The invention is not limited by the number of support pulleys. Any number of support pulleys in numerous orientations may be used to practice the invention.

In an alternate embodiment not shown, air cylinder 23 may be replaced with a spring. The spring is connected to pulley 22 in a manner to increase the effective weight of the pulley 22. In relation to FIG. 2, the spring would be positioned and biased to resist the vertical upward movement of pulley 22 as fiber accumulates on spool 24. Preferably, the target running position of pulley 22 is varied in accordance with the spring properties in order to maintain a substantially constant lateral load. The target running position is the desired disposition of pulley 22 along path A such that the pulley 22 reaches position A1 as the spool is completely full. Thus, the force exerted by the spring on the fiber, through pulley 22, is increased as the spring is further elongated. Therefore, the target running position Z of pulley 22 would move upward as fiber accumulates on spool 24.

Figure 4:
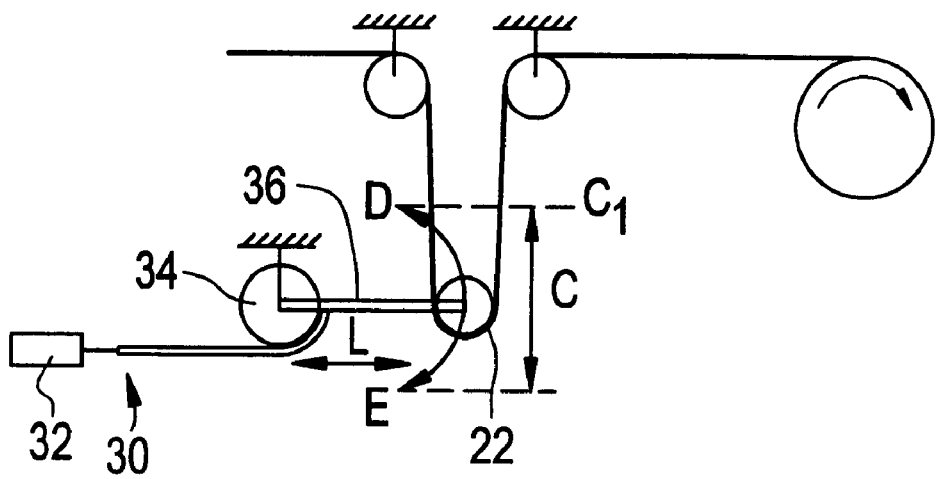
FIG. 4 is a schematic view of an embodiment of the invention which includes a rotary dancer pulley.

In another embodiment of the invention, pulley 22 may be a rotary dancer pulley, as illustrated in FIG. 4. A rotary dancer pulley is a dancer pulley that is mounted on a rotating arm 36. Rotary dancer 22 of FIG. 4, may travel along a vertical distance the length of line C in the direction of either arrows D or E. Arm 36 is connected to a device 30 which applies a force upon pulley 22. The device illustrated in FIG. 4 includes an air cylinder 32 and a mechanical linkage element 34 which transforms the lateral force exerted by the air cylinder into a force that pulley 22 transmits to the fiber through direct contact. This occurs regardless of the position of pulley 22 along the path of line C. Linkage element 34 may also be known as a linear force transducer.

In order to practice the invention, the tension in the fiber must increase as the pack radius of the fiber on take-up spool 24 increases. To increase the tension applied to the fiber, air cylinder 32 will at least inhibit pulley 22 from moving in an upward direction along the path of arrow D toward vertical position $C_1$. The tension applied to the fiber is equal to a torque applied by air cylinder 32 onto element 34 divided by length L between linkage element 34 and pulley 22. Thus, to practice the invention, the force exerted by air cylinder 32 must increase as fiber collects on the take-up spool. In maintaining the desired substantially constant lateral load as fiber is wound onto the spool, it is preferred that the pack radius is known prior to winding or through a measurement system. Then, the necessary target tension can be calculated and established by a controller not shown in communication with air cylinder 32.

Figure 5:
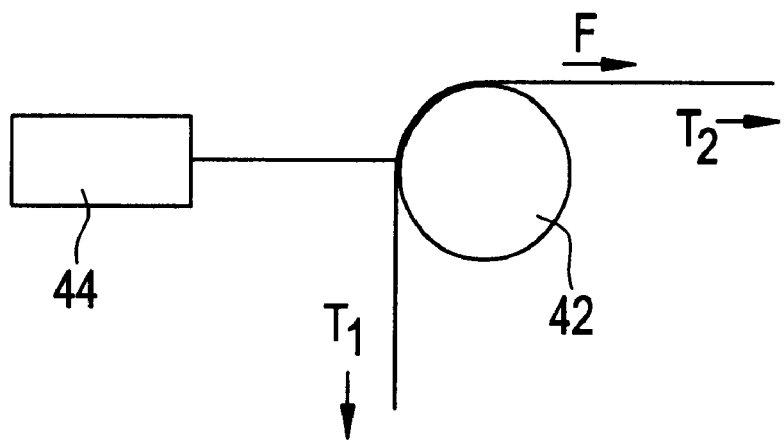
FIG. 5 is a further embodiment of the invention.

In an additional embodiment of the invention, the invention may be practiced by changing the drag applied to the fiber by a pulley or pulleys disposed upstream of the take-up spool and downstream of the dancer pulley. Referring back to FIG. 2, a motor may be attached to pulley 28 instead of attaching air cylinder 23 to pulley 22. FIG. 5 depicts a downstream support pulley 42 representative of support pulley 28 in FIG. 2. In FIG. 5, the fiber is traveling over pulley 42 to a take-up spool (not shown) in the direction of arrow F. In FIG. 5, the tension in the upstream leg of fiber is generated by the deadweight dancer and is represented by $T_1$. The tension in the downstream leg, $T_2$, equals the sum of $T_1$ plus all forms of resistance on pulley 42. Forms of resistance include, but are not limited to, aerodynamic drag, bearing friction, etc.

Pulley 42 may be driveably attached to a motor 44, which will apply a torque on pulley 42. A clockwise torque applied to pulley 42 may be used to offset the drag forces on pulley 42 and reduce tension $T_2$ in doing so. It is preferred that the torque applied to pulley 42 is of a sufficient amount to overcome friction and drag forces which resist rotation of pulley 42.

To maintain a constant lateral load, the target tension to be applied to the fiber can be increased as the pack radius increases by reducing the clockwise torque applied to pulley 42. The tension may be increased by decreasing the voltage supply to motor 44 and thereby reduce the torque applied by the motor onto the pulley.

Alternatively, a mechanical brake could be configured to apply a braking force on pulley 42. This would increase the tension $T_2$ in the downstream fiber. To maintain a constant lateral load, the target tension to be applied to the fiber can be increased as the pack radius increases by increasing the braking force applied to pulley 42. Applying the braking force may also be referred to as applying a counter clockwise torque to pulley 42.

The invention also includes a method to prevent permanent deformation of a coating of an optical fiber wound onto a spool. This method includes applying an increasing amount of tension to the fiber as the fiber accumulates on the spool. A substantially constant lateral load is maintained on the fiber wound on the spool. Preferably, the increasing amount of tension is proportional to an increase in the radius of the fiber accumulated on the spool.

The invention further includes a method of winding optical fiber onto a spool in which a target tension applied to an optical fiber, as the fiber accumulates onto the spool, is varied linearly with respect to pack radius such that the target tension applied to the fiber at the end of winding fiber onto the spool is at least about 0.1% or greater than the target tension at the start of winding fiber onto the spool. For this aspect of the invention, it is preferred that the ending pack radius is at least 60% larger than the outer radius of the barrel of the spool. It is also preferred that the target tension applied to the fiber at the end of winding comprises at least about 25% or greater than the target tension at the start of winding fiber onto the spool. It is more preferred that the target tension applied to the fiber at the end of winding comprises at least about 50% or greater than the target tension at the start of winding fiber onto the spool. It is most preferred that the target tension applied to the fiber at the end of winding comprises at least about 59% or greater than the target tension at the start of winding fiber onto the spool. In the case that the increase in pack radius is 60%, it is further most preferred that the target tension is not more than 61% greater than the target tension at the start of winding fiber onto the spool.

It is also preferable that the invention is incorporated into a closed loop control system. According to the invention, the radius of fiber accumulated on the spool (pack radius) is an important piece of data. A schedule of pack radius (vs. total fiber length for example) could be estimated from prior empirical data and be used in an open loop control system. However, it is preferable to use a closed loop control. In a closed loop control scheme, the pack radius would be monitored directly and transmitted to a controller which would calculate the tension target value required at the current measured radius to maintain the substantially constant lateral load value. The controller would calculate the tension target in proportion to the currently measured pack radius. A tension measurement device placed immediately upstream of the take-up spool would monitor the winding tension of the fiber. The tension feedback would be used by the controller to compare the actual winding tension to the calculated winding tension target. In the event that these two values differ, the controller would alter the variable tension mechanism until the actual winding tension matched the tension target. As the fiber builds up on the take-up spool, the controller would adjust the tension target to maintain the substantially constant lateral load for the current pack radius of the wound fiber.

Suitable alternative embodiments of the invention include any technique which may be used to control lateral load. Practicing this method will prevent irreversible deformation of the coating layers of the fiber wound onto the spool. Practicing this method will also maintain a constant wind quality for the fiber wound on the spool.

EXAMPLES

The invention will be further clarified by the following examples which are intended to be exemplary of the invention.

With respect to a particular advantageous lateral load for wind quality and the prevention of flat spots, what lateral load is advantageous for a coated optical fiber depends on such factors as coating modulus, coefficient of friction of the outer coating of the coated fiber, and the cross-over angle between adjacent layers of fiber. The crossover angle is the angle between the individual layers of fiber as the fiber accumulates on the take-up spool. The cross-over angle is formed by the fiber being wound along the barrel of the fiber from one flange of the spool to another flange of the spool. As the fiber traverses back and forth from each flange of the spool, the angle of the fiber relative to the spool flange in one layer is different than that in the adjacent layer below. The cross-over angle is caused by the pitch of the fiber as it is wound onto the spool.

As for the coating modulus, it would be ideal to know the coating modulus as the fiber is wound onto the spool and the degree of cure of the fiber as the fiber is wound onto the spool. With knowledge of the materials science and the mechanics of deformable solids, a person could calculate appropriate lateral load values for a particular fiber coating. As a practical matter however, the necessary lateral load can be determined empirically by observing wind quality and checking for flat spots while monitoring winding tension and pack radius.

Single mode fiber (commercially available as SMF-28 from Corning, Incorporated of Corning, N.Y.) was wound onto a spool having a 4 inch radius. The fiber was coated with the UV curable dual acrylate coating system available from DSM of Elgin, Ill. The cured coating system includes a primary coating having a Young's modulus of about 1.1 to about 1.3 MPa and a secondary coating having a Young's modulus of about 500 to about 700 MPa.

The length of fiber tested, for each test, was about 350 km. The fiber was drawn at a rate of more than about 20 m/s. During drawing, the pack radius increased from an initial radius of about 4 inches to about 6 and ⅜ inches. The fiber was tested in accordance with the embodiment of the invention illustrated in FIG. 2. In the first set of tests pulley 22 was a pulley with a mass of 120 g. In a second set of tests, pulley 22 was a pulley with a mass of 150 g.

For each pulley, fiber was wound onto take-up spool 24 under at least two sets of conditions. First, the fiber was wound onto take-up spool 24 under the condition of constant tension. Second, the fiber was wound onto take-up spool 24 under the condition of substantially constant lateral load. As for the constant lateral load test, the fiber was wound onto take-up 24 spool under at least six different substantially constant lateral loads. The fiber was inspected for flat spots using the coating geometry measurement bench (hereinafter "GEM bench") and the wind quality of the fiber wound on the spool was examined visually for the formation of dog-bones. One provider of a GEM bench is GN NetTest; Beaverton, Oreg.

The GEM bench is used to evaluate the coated fiber for flat spots. The outer diameter (hereinafter "OD") of the primary coating of the coated fiber is measured at 9 rotational orientations, each 40 degrees apart. The Primary OD Delta is defined as the maximum of those 9 values minus the minimum of those 9 values. This measurement is repeated for 20 segments of fiber in close proximity (each segment is within 3 meters of an adjacent segment). The flat spot value for this fiber equals the average of the 20 primary OD delta values. An example of the calculation is shown below:

Test segment #1:

| Fiber orientation (degrees) | Primary Diameter (microns) |
|---|---|
| 0 | 190.0 |
| 40 | 189.5 |
| 80 | 190.1 |
| 120 | 190.5 |
| 160 | 191.2 |
| 200 | 189.5 |
| 240 | 190.1 |
| 280 | 189.7 |
| 320 | 190.3 |
| Maximum | 190.5 microns |
| Minimum | 189.5 microns |
| Primary OD Delta | 1.0 microns |

For segments 2–20, only primary OD delta for segments 2–20 is provided.

| Test segment #2: | Primary OD Delta | 1.4 | microns |
|---|---|---|---|
| Test segment #3: | Primary OD Delta | 1.3 | microns |
| Test segment #4: | Primary OD Delta | 0.6 | microns |
| Test segment #5: | Primary OD Delta | 0.9 | microns |
| Test segment #6: | Primary OD Delta | 1.1 | microns |
| Test segment #7: | Primary OD Delta | 1.3 | microns |
| Test segment #8: | Primary OD Delta | 1.7 | microns |
| Test segment #9: | Primary OD Delta | 1.6 | microns |
| Test segment #10: | Primary OD Delta | 1.3 | microns |
| Test segment #11: | Primary OD Delta | 1.4 | microns |
| Test segment #12: | Primary OD Delta | 1.3 | microns |
| Test segment #13: | Primary OD Delta | 1.3 | microns |
| Test segment #14: | Primary OD Delta | 1.4 | microns |
| Test segment #15: | Primary OD Delta | 1.2 | microns |
| Test segment #16: | Primary OD Delta | 1.3 | microns |
| Test segment #17: | Primary OD Delta | 1.1 | microns |
| Test segment #18: | Primary OD Delta | 1.3 | microns |
| Test segment #19: | Primary OD Delta | 1.1 | microns |
| Test segment #20: | Primary OD Delta | 1.3 | microns |

Flat Spot Value = 1.245

It is preferred that the flat spot value is below 3.5. It is more preferred that the flat spot value is below 3.0.

The pack radius increased in accordance with the length of fiber wound onto the take-up spool according to the following schedule: (1) 50 km, the pack radius was about 4.4"; (2) 100 km, the pack radius was about 4.8"; (3) 125 km, the pack radius was about 5.0"; (4) about 150 km, the pack radius was about 5.2"; (5) about 200 km, the pack radius was about 5.5"; (6) 250 km, the pack radius was about 5.8"; (7) about 300 km, the pack radius was about 6.1"; and (8) 350 km, the pack radius was about 6.4".

The lateral load results of the testing are illustrated in FIG. 6. Under a constant lateral load for the aforementioned coating system, for minimal flat spots and acceptable wind quality, it is preferred that the lateral load is no more than about 6.3 N/m and at least about 3.9 N/m. It is more preferred that the lateral load is no more than about 5.9 N/m and is at least about 4.2 N/m. It is most preferred that the lateral load is no more than about 5.5 N/m and is at least about 4.6 N/m.

Also shown in FIG. 6, are the results of winding the fiber under constant tension, the potential for flat spots to form during the winding of the fiber over a 150 g pulley is too high until the lateral load diminishes to less than 6.3 N/m. This length of fiber correlates up to approximately 100 km of fiber being wound onto take-up spool 24. As for the 120 g dancer pulley, under constant tension, it exhibited a propensity for poor wind quality, namely dogbone, for about the last 100 km of fiber being wound onto take-up spool 24. This propensity to form dogbones correlates to a lateral load of less than about 3.9 N/m.

The change in tension during winding is illustrated in FIG. 7. As for the constant tension experiments, the winding tension on the fiber generated by 120 g dancer was about 0.6 N, with respect to the 150 g pulley, the tension was more than about 0.7 N. For a lateral load of about 3.9 N/m, the tension increased from about 0.4 N to more than about 0.6 N. For a lateral load of about 4.2 N/m, the tension increased from about 0.4 N to about 0.7 N. For a lateral load of about 4.6 N/m, the tension increased from more than about 0.4 N to more than about 0.7 N. For a lateral load of about 5.5 N/m, the tension increased from more than about 0.5 N to about 0.9 N. For a lateral load of about 5.9 N/m, the tension increased from about 0.6 N to more than about 0.9. For a lateral load of about 6.3 N/m, the tension increased from more than about 0.6 N to more than about 1.0 N.

It will be apparent to those skilled in the art that various modifications and variations can be made to the present invention without departing from the spirit and scope of the invention. Any concept that increases the tension applied to the fiber as the amount of fiber accumulated on the spool increases is suitable. Thus, it is intended that the present invention covers the modifications and variations of this invention provided they come within the scope of the appended claims and their equivalents.

What is claimed is:

1. A method of winding optical fiber onto a spool comprising varying a target tension applied to an optical fiber as the fiber accumulates onto the spool, such that the percent change in lateral load is greater than about −3.4% for each change of about 0.25" in pack radius.

2. The method of claim 1 wherein said varying the tension applied to an optical fiber comprises increasing the tension.

3. The method of claim 2 wherein said increasing tension comprises applying a force to a dancer pulley in a direction to increase tension applied to the fiber.

4. The method of claim 3 wherein said applying a force comprises exerting a force on the pulley using an air pressure cylinder.

5. The method of claim 3 wherein the dancer pulley comprises a rotary dancer pulley.

6. The method of claim 3 wherein said increasing tension comprises applying a torque to one or more fixed pulleys located between the dancer pulley and the spool.

7. The method of claim 6 wherein said applying torque comprises a torque supplied by a motor driveably connected to the fixed pulley.

8. The method of claim 6 wherein said applying a torque comprises a force supplied by a brake impeding the rotation of the fixed pulley.

9. The method of claim 2 wherein an amount of increase in the tension during said increasing comprises an amount proportional to an increase in pack radius.

10. The method of claim 1 further comprising maintaining the lateral load within a predetermined range, thereby preventing permanent deformation of a coating on the fiber wound on the spool.

11. The method of claim 10 wherein the predetermined range comprises less than about 6.3 N/m.

12. The method of claim 11 wherein the predetermined range comprises less than about 5.5 N/m.

13. The method of claim 1 further comprising maintaining the lateral load within a predetermined range, thereby producing a desirable wind quality of the fiber wound onto the spool.

14. The method of claim 13 wherein the range comprises more than about 3.9 N/m.

15. The method of claim 14 wherein the range comprises more than about 4.6 N/m.

16. The method of claim 1 wherein the percent change in lateral load comprises about −1% or greater.

17. The method of claim 1 wherein a lateral load applied to fiber wound on the spool comprises about 24% or less of the lateral load at the beginning of winding fiber on the spool.

18. The method of claim 17 wherein a change in lateral load is no more than about 15%.

19. A method of winding optical fiber onto a spool comprising varying a target tension applied to an optical fiber as the fiber accumulates onto the spool, such that the change in lateral load per change in pack radius comprises an amount greater than about −18.0 N/M$^2$.

20. The method of claim 19 wherein the change in lateral load per change in pack radius comprises an amount greater than about −1.0 N/M$^2$.

21. A method of winding optical fiber onto a spool comprising varying a target tension applied to an optical fiber as the fiber accumulates onto the spool, such that the target tension applied to the fiber at the end of winding fiber onto the spool comprises at least about 0.1% or greater than the target tension at the start of winding fiber onto the spool.

22. The method of claim 21 wherein the target tension applied to the fiber at the end of winding comprises at least about 25% or greater than the target tension at the start of winding fiber onto the spool.

23. A method of winding an optical fiber onto a spool comprising varying a target tension applied to the fiber as fiber accumulates onto the spool, such that a lateral load applied to the fiber wound on the spool is substantially constant.

24. The method of claim 23 wherein said varying a tension comprises increasing the tension.

* * * * *